United States Patent
Wood

[11] Patent Number: 5,412,375
[45] Date of Patent: May 2, 1995

[54] METHOD OF SELECTING AN AIR INTERFACE FOR COMMUNICATION IN A COMMUNICATION SYSTEM

[75] Inventor: Daniel E. Wood, Crystal Lake, Ill.

[73] Assignee: Motorola, Inc., Schaumburg, Ill.

[21] Appl. No.: 127,216

[22] Filed: Sep. 27, 1993

[51] Int. Cl.6 .......................................... H01H 67/00
[52] U.S. Cl. ................................ 340/825.03; 379/60; 455/33.1
[58] Field of Search ............... 340/825.03; 375/5; 455/33.1, 33.2, 54.1; 379/59, 60

[56] References Cited

U.S. PATENT DOCUMENTS

| | | | |
|---|---|---|---|
| 5,091,942 | 2/1992 | Dent | 379/59 |
| 5,140,627 | 8/1992 | Dahlin | 379/60 |
| 5,175,867 | 12/1992 | Wejke et al. | 379/60 |
| 5,199,031 | 3/1993 | Dahlin | 455/33.1 |
| 5,299,198 | 3/1994 | Kay et al. | 455/33.1 |
| 5,308,286 | 4/1994 | Wiedeman | 379/60 |

Primary Examiner—Donald J. Yusko
Assistant Examiner—Gregg V. Miller
Attorney, Agent, or Firm—Raymond J. Warren

[57] ABSTRACT

In a communication system having a plurality of air interfaces, one of the air interfaces is assigned for use for a desired communication by transmitting a message, having a list of air interface capabilities of the subscriber, from the subscriber to a base (12). A list of air interface capabilities of the base is then compared, at a controller, with the list from the subscriber (14). A compatible air interface, or list of compatible air interfaces, is generated by the controller and provided to the base (15, 31). The base will then direct the subscriber to access the communication system utilizing a compatible air interface (18, 35).

14 Claims, 4 Drawing Sheets

METHOD OF SELECTING AN AIR INTERFACE FOR COMMUNICATION IN A COMMUNICATION SYSTEM

FIELD OF THE INVENTION

The present invention relates, in general, to communication systems and, more particularly, to a method of selecting an air interface for communication in a communication system.

BACKGROUND OF THE INVENTION

Presently, communication systems, particularly cellular communication systems, operate on one basic air interface standard. For example there are Analog Mobile Phone Systems (AMPS) whose air interface is described in detail in EIA/TIA (Electronics Industry Association/Telecommunications Industry Association) IS-53 (Interim Standard). Other standards include the presently pending TDMA (Time Division Multiple Access) standard, IS-54, and a CDMA (Code Division Multiple Access) standard, IS-95.

In order to provide compatible systems, subscriber units are being provided which will operate on both, or multiple, systems. These are commonly referred to as dual mode, or multimode, subscriber units. However, in places where newer systems, (TDMA or) CDMA, are available along with an AMPS system, there may be a separate network providing service to the subscriber. In operation, the dual mode subscriber would first attempt to access the CDMA system. Failing this, the dual mode subscriber would attempt to access the AMPS system.

In the future, it is envisioned that the networks will also be dual, or multiple, mode by offering more than one air interface type over which to operate. When this occurs, it will be necessary for the network to determine what type of several air interfaces to which a subscriber, having multiple modes, will be assigned. Therefore, there is a need to provide a method of matching and selecting the appropriate air interface to be used for the communication.

SUMMARY OF THE INVENTION

The present invention provides a method of selecting an air interface with takes into account the capabilities of the subscriber and the particular system side transceiver with which it desires to communicate. More particularly, in a communication system having a plurality of air interfaces, one of the air interfaces is assigned for use for a desired communication by transmitting a message, having a list of air interface capabilities of the subscriber, from the subscriber to a base. A list of air interface capabilities of the base is then compared, at a controller, with the list from the subscriber. A compatible air interface, or list of compatible air interfaces, is generated by the controller and provided to the base. The base will then direct the subscriber to access the communication system utilizing a compatible air interface.

DETAILED DESCRIPTION OF THE DRAWINGS

Figure 1:
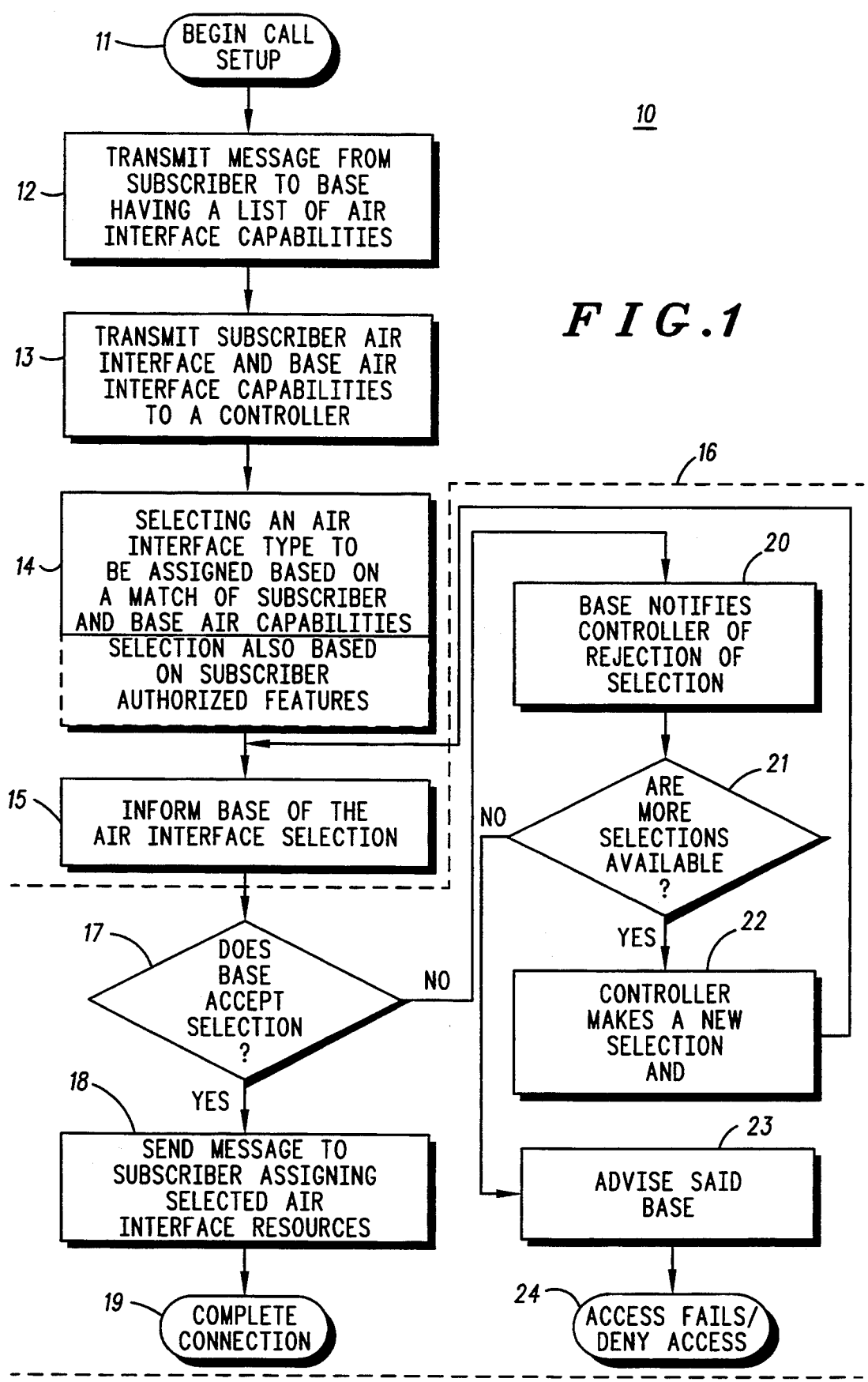
FIG. 1 is a block diagram of a system flow chart illustrating one embodiment of the present invention.
Figure 4:
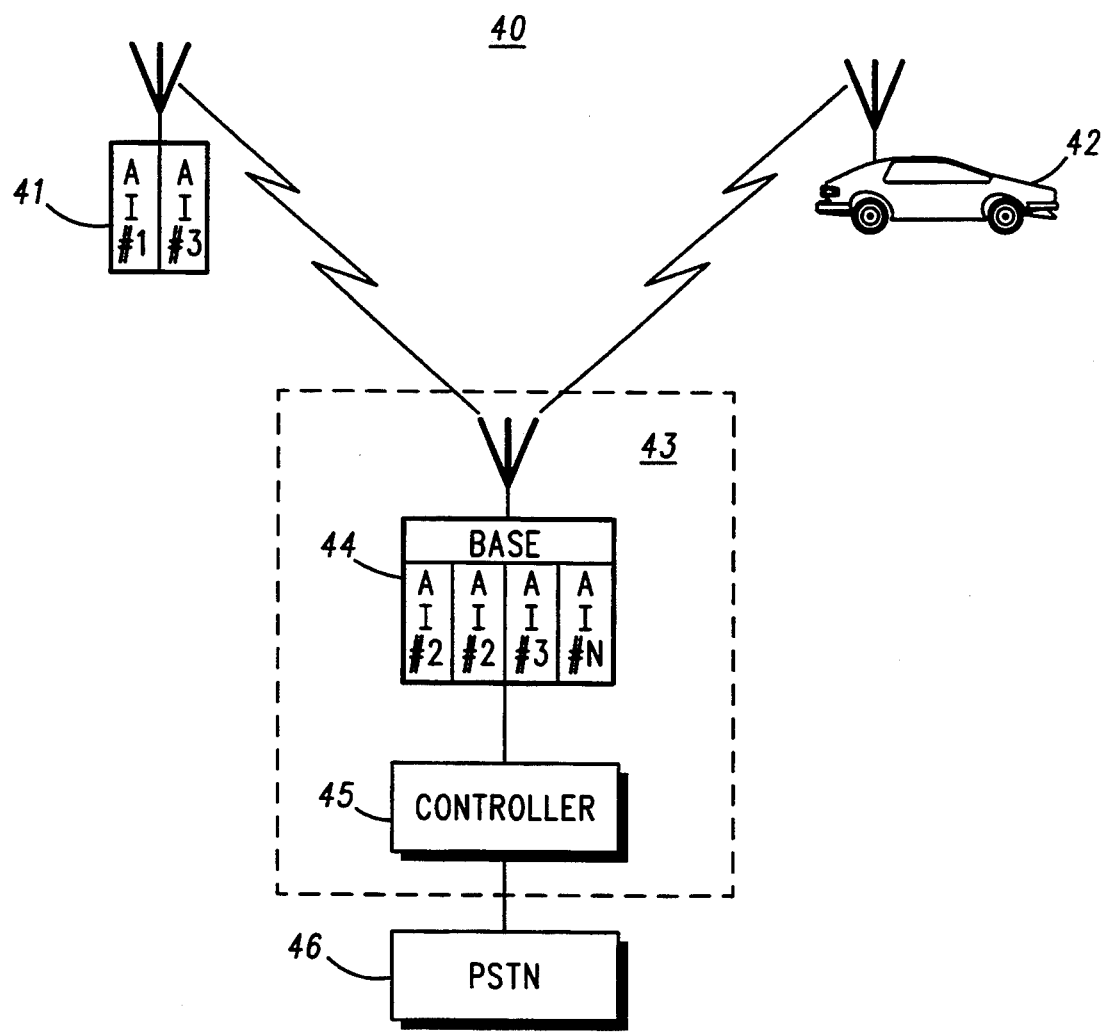
FIG. 4 is a block diagram representing a communication system capable of utilizing the present invention.

Referring initially to FIG. 1, a flow chart of a process, generally designated 10, of one embodiment of the present invention is illustrated. Process 10 begins at step 11 when a call setup is requested. This request may be generated by a subscriber unit, such as units 41 and 42 of FIG. 4; or may be requested by the network, such as network 43.

Once a call setup has been requested, subscriber 41 will transmit a message to a base 44. This message will contain a list of the air interface capabilities of subscriber 41, step 11. In this example, subscriber 41 will show that it is compatible with air interfaces #1 and #3. An example of the type of messaging used in communication systems can be found in the GSM (Groupe Special Mobile also known as the Global System for Mobile communication) TDMA standard. In particular GSM Recommendation 08.08, v3.10.1, §3.2.1 (2/92), illustrates current message assignments.

Once the message from the subscriber is received, base 44 transmits this information along with its own air interface capabilities to a controller 45, step 13. It should be noted here that the controller may be a part of a base site 43, represented by the dashed line of FIG. 4, or may be separate from the base site. One type of separate controller is a Mobile Switching Center (MSC), which serves as the connection with the Public Switched Telephone Network (PSTN) 46. In this example, the air interface capabilities of the base are air interfaces #1, #2, #3, and #N.

Controller 45 will select an air interface to be used based upon a comparison of the lists from the subscriber and the base, step 14. Base 44 is then informed of the selection, step 15. Process 10 next enters a subprocess 16 where the controller and base interact to complete the air interface assignment process. The next step in process 10 is a decision step 17 where it is determined if the base will accept the selection made by controller 45. This step is necessary since it is possible that the resources needed to function with the selected air interface may not be available. For instance, when the setup process begins, steps 12 and 13, base 44 has air interface #1 available. However, before the selection is made by controller 45, the resources for air interface #1 may have been assigned by base 44 to another call. Therefore, base 44 would not be able to accept the air interface selection of controller 45.

If base 44 does accept the selection from controller 45, a message is sent to subscriber 41 indicating the air interface selected, step 18, and the call connection is completed, step 19.

If base 44 does not accept the selection from controller 45, then base 44 will notify the controller of the rejection, step 20. Upon notification, controller 45 will determine if more compatible air interfaces are available, decision step 21. If there are no more compatible air interfaces, base 44 is notified, step 23, and the call attempt will fail, step 24. If there are other compatible air interfaces available, another selection will be made by controller 45, step 22, and the base will be notified, step 15. Subprocess 16 will repeat until a solution is reached.

In the present example, both the subscriber and base will operate on air interface #3. Therefore, air interface #3 would be selected in step 22 and conveyed to the base, step 15. If this is rejected by the base, since there are no other compatible air interfaces available, the access would fail, step 24.

It is also possible in the above selection process by controller 45 to consider authorized features available to the subscriber. This would be used in step 14. For example, for political reasons (e.g. if dual mode phones are required) or business reasons (e.g. a dual mode phone costs the same to make as a single mode phone) a subscriber may have a dual mode phone, but not be authorized to use both modes. One situation where a feature would have an impact on an air interface selection is where different rates are charged for different air interfaces. Given that air interface #3 is a higher quality interface, the subscriber would be charged more for access to that air interface. However, if air interface #3 is at capacity, the subscriber would generally rather get the lower quality air interface #1 than be denied a call. In this case, the process would proceed as described above with the controller first selecting air interface #3 and then #1, if #3 was rejected by the base.

On the other hand, a user may elect to only subscribe to the less expensive, lower quality air interface #1, even though the subscriber unit could operate on both air interfaces. In this instance, a limitation against assignment to air interface #3 would be stored in a subscriber feature file in the system. When the controller went to select the air interface, air interface #3 would be eliminated based upon the subscriber features listed as being available.

Figure 2:
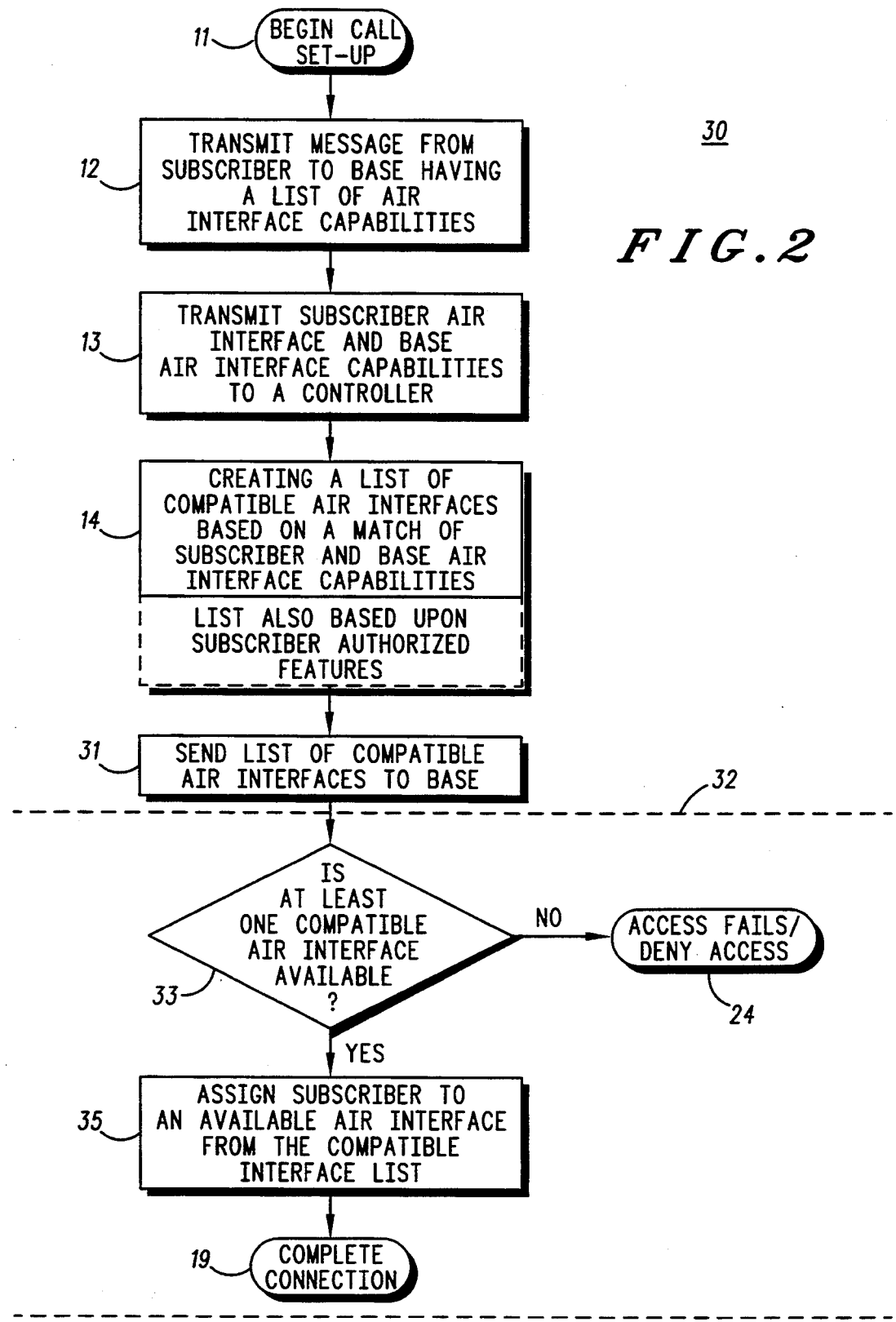
FIG. 2 is a block diagram of a system flow chart illustrating a second embodiment of the present invention.

Referring now to FIG. 2, a flow chart of a process, generally designated 30, of a second embodiment of the present invention is illustrated. Process 30 begins in the same manner as process 10 by obtaining a list of air interface capabilities of the subscriber and base and forwarding these lists to controller 45, steps 11–14. In this embodiment, instead of selecting one air interface and notifying the base, controller 45 provides a list of compatible air interfaces to base 44, step 31. The base then takes the actions set forth in subprocess 32.

Once the list of compatible air interfaces is received by base 44, it determines if at least one of the listed air interfaces is available. If not available, the access attempt fails, step 24. If there is at least one compatible air interface, base 44 will assign the call to one of the compatible air interfaces, step 35. The connection will then be completed, step 19.

In this embodiment, the list generated may have some intelligence associated therewith. For example, the compatible list may be rank ordered by some operator designated preference. In addition, the list may be modified by particular subscriber features as described above. Namely, air interface #3 may be ranked preferable to air interface #1; or air interface #1 may not be subscribed to by the user and, therefore would not be included on the list.

Figure 3:
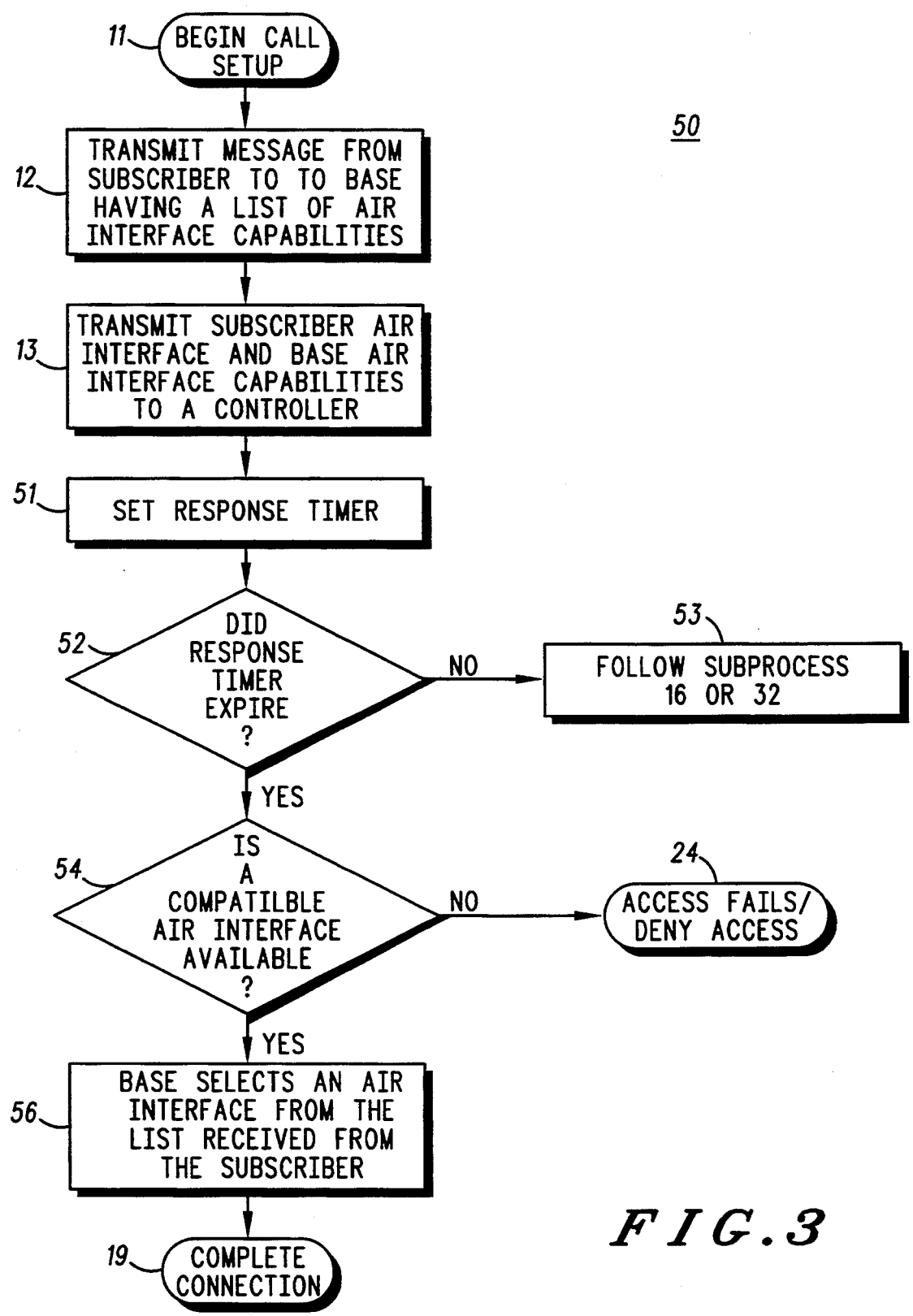
FIG. 3 is a block diagram of a flow chart illustrating a third embodiment of the present invention.

Referring now to FIG. 3, a flow chart of a process, generally designated 50, of a third embodiment of the present invention is illustrated. Process 50 represents the actions taken from more of a base perspective. Process 50 begins in the same manner as processes 10 and 30 by obtaining and conveying the lists air interface lists, steps 11–13. However the base should not be designed to await an indefinite amount of time for a response. Instead, the base will set a response timer, step 51.

If a reply is received from controller 45 before the response timer expires, step 52, then process 50 will proceed with subprocess 53. Subprocess 53 can be either subprocess 16 of FIG. 1 or subprocess 32 of FIG. 2.

If a reply is not received from controller 45 within the response time, process 50 proceeds to decision step 54 where base 44 determines if there is a compatible air interface between itself and the subscriber. If no compatible air interface exists, then the access fails, step 24. If there is one or more compatible air interfaces, then the base selects one, step 56, and the connection is completed, step 19.

A benefit of this type of architecture is that multiple air interface standards can be provided for at a single location. This eliminates the need to install separate equipment for each air interface and allows for dynamic allocation of compatible resources at the base sites. It also gives the system operators the ability to shift systems gradually from one air interface to another without having to install separate systems.

Thus, it will be apparent to one skilled in the art that there has been provided in accordance with the invention, a method of selecting an air interface for communication in a communication system that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

The invention claimed is:

1. A method, for use in a communication system having a plurality of air interfaces, of assigning one of said plurality of air interfaces to a subscriber, said method comprising the steps of:

transmitting a message from said subscriber to a base of said communication system, said message having a list of air interface capabilities of said subscriber;

transmitting said list of air interface capabilities and a list of air interface capabilities of said base to a controller of said communication system;

selecting, at said controller, an air interface based upon a comparison of said lists of air interface capabilities of said subscriber and said base;

informing said base of said air interface selected by said controller; and directing said subscriber to utilize said air interface selected by said controller.

2. The method of claim 1 wherein said step of selecting said air interface further comprises the step of making said selection based upon a feature capability of said subscriber.

3. The method of claim 1 further comprising the steps of:

accepting, at said base, said air interface selected by said controller;

notifying said controller if said base rejects said air interface selected by said controller;

selecting a new air interface based upon said comparison of said lists of air interface capabilities of said subscriber and said base if said new air interface exists;

advising said base that said new air interface has been selected if said new air interface exists; and advising said base of the lack of a new air interface if said new air interface is not selected.

4. The method of claim 1 wherein said plurality of air interfaces comprises an analog air interface and a digital air interface.

5. The method of claim 4 wherein said digital air interface is a time division multiple access system or a code division multiple access system.

6. The method of claim 1 further comprising the step of selecting an air interface, at said base, if said controller fails to inform said base of said air interface selected being selected.

7. A method, for use in a communication system having a plurality of air interfaces, of assigning one of said plurality of air interfaces to a subscriber, said method comprising the step of:

transmitting a message from said subscriber to a base of said communication system, said message having a list of air interface capabilities of said subscriber;

transmitting said list of said air interface capabilities of said subscriber and a list of air interface capabilities of said base to a controller;

selecting, at said controller, a first air interface based upon a comparison of said lists of air interface capabilities of said subscriber and said base;

informing said base of said first air interface;

directing said subscriber to utilize said first air interface if said base accepts said first air interface;

notifying said controller if said base rejects said first air interface;

selecting, at said controller, a second air interface, if said second air interface exists, based upon said comparison of said lists of air interface capabilities of said subscriber and base;

informing said base of said second air interface; and directing said subscriber to utilize said second air interface if said base accepts said second air interface.

8. The method of claim 7 wherein said plurality of air interfaces comprises an analog air interface and a digital air interface.

9. The method of claim 8 wherein said digital air interface is a time division multiple access system or a code division multiple access system.

10. The method of claim 7 further comprising the step of selecting an air interface, at said base, if said controller fails to inform said base of said air interface selected.

11. A method, for use in a communication system having a plurality of air interfaces, of assigning one of said plurality of air interfaces to a subscriber, said method comprising the step of:

transmitting a message from said subscriber to a base of said communication system, said message having a list of air interface capabilities of said subscriber;

transmitting said list of air interface capabilities of said subscriber and a list of air interface capabilities of said base to a controller of said communication system;

creating, at said controller, a compatible air interface list based upon a comparison of said lists of air interface capabilities of said subscriber and said base;

informing said base of said compatible air interface list;

directing said subscriber to utilize a first compatible air interface from said compatible air interface list if at least one compatible air interface is available;

directing said subscriber to utilize said first compatible air interface if said first compatible air interface is available; and denying access to said subscriber if said first compatible air interface is unavailable.

12. The method of claim 11 wherein said plurality of air interfaces comprises an analog air interface and a digital air interface.

13. The method of claim 12 wherein said digital air interface is a time division multiple access system or a code division multiple access system.

14. The method of claim 11 further comprising the step of selecting an air interface, at said base, if said controller fails to inform said base of said air interface selected.

* * * * *